(12) United States Patent
Evrard

(10) Patent No.: US 6,631,793 B2
(45) Date of Patent: Oct. 14, 2003

(54) TORQUE TUBE AND CONICAL BACK PLATE FOR AIRCRAFT BRAKE SYSTEMS

(75) Inventor: John G. Evrard, Canal Fulton, OH (US)

(73) Assignee: Aircraft Braking Systems Corporation, Akron, OH (US)

( * ) Notice: Subject to any disclaimer, the term of this patent is extended or adjusted under 35 U.S.C. 154(b) by 0 days.

(21) Appl. No.: 10/022,749

(22) Filed: Dec. 13, 2001

(65) Prior Publication Data

US 2003/0111304 A1 Jun. 19, 2003

(51) Int. Cl.[7] ............................................... F16D 55/36
(52) U.S. Cl. .................... 188/71.5; 188/71.1; 188/71.6
(58) Field of Search ...................... 188/71.1, 264 AA, 188/71.6, 71.5, 264 G; 301/6.1, 6.2

(56) References Cited

U.S. PATENT DOCUMENTS

| | | | | |
|---|---|---|---|---|
| 3,836,201 A | * | 9/1974 | Stimson et al. .............. 301/6.2 |
| 3,983,974 A | * | 10/1976 | Dowell et al. ........ 188/264 AA |
| 5,248,013 A | * | 9/1993 | Hogue et al. ............ 188/264 G |
| 5,437,352 A | * | 8/1995 | Harker ........................ 188/71.5 |
| 5,485,898 A | * | 1/1996 | Patko ......................... 188/71.5 |
| 6,095,293 A | * | 8/2000 | Brundrett et al. .......... 188/72.1 |

* cited by examiner

*Primary Examiner*—Jack Lavinder
*Assistant Examiner*—Mariano Sy
(74) *Attorney, Agent, or Firm*—Renner, Kenner, Greive, Bobak, Taylor & Weber

(57) ABSTRACT

A torque tube and conical back plate for aircraft brakes including a torque tube having a truncated back plate of thin metal construction extending from the outboard end thereof. The conical back plate is characterized by inner and outer reinforcing rings, such rings providing a compressive force at opposite ends of the truncated cone of the back plate, thus allowing the back plate to resist bending and deflection. In accordance with the invention, the cross sectional centers of mass of the inner and outer reinforcing rings are shifted outboard from a projection of the center plane of the conical back plate, such positioning enhancing the stiffening and reinforcing capabilities of the reinforcing rings.

3 Claims, 3 Drawing Sheets

TORQUE TUBE AND CONICAL BACK PLATE FOR AIRCRAFT BRAKE SYSTEMS

TECHNICAL FIELD

The invention herein resides in the art of aircraft brakes and, more particularly to those employing brake disk stacks or heat sinks comprised of alternately interleaved stator and rotor disks. More particularly, the invention relates to a back plate configured for such brake disk stacks. Specifically, the invention relates to a conical back plate connected to a torque tube and extending from the outboard end thereof, the conical back plate being stiffened and reinforced by the unique positioning of rings at truncated ends thereof.

BACKGROUND OF THE INVENTION

Aircraft brakes typically consist of a stack or heat sink of alternately interleaved stator and rotor disks. The stator disks are mounted upon a torque tube and are axially movable thereon. The rotor disks are keyed to the aircraft wheel both axially movable thereon and rotatable therewith. Accordingly, the brake disk stack comprises alternately interleaved rotor disks that rotate with the wheel and stator disks that are non-rotatable. At one end of the stack, a pressure plate is provided for actuation by appropriate pistons that are hydraulically or electrically actuated. At the opposite end of the stack, a stationary back plate is maintained. Accordingly, actuation of the pressure plate by the pistons urges the stators and rotors into frictional contacting engagement with each other against the stationary back plate. Those skilled in the art will appreciate that the back plate receives all of the compressive braking force associated with the brake disk stack.

It is well known that considerations of weight are paramount in aircraft designs. It is most desirable to minimize the weight of every structure associated with the aircraft to improve the efficiency and load bearing capabilities of the aircraft. Accordingly, while the back plate of the brake disk stack may be a solid planar plate, such plate imparts significant and unnecessary mass to the brake disk stack. In the past, the art has evolved to a metallic conical back plate extending from the outboard end of the torque tube and in the form of a truncated cone. This conical back plate receives and withstands the axial brake force imparted to the brake disk stack, and does so by withstanding the tension imparted therein. Accordingly, back plates of a truncated conical nature primarily serve as a membrane placed in tension by the braking force. Since this conical membrane is necessarily as thin as possible to satisfy necessary weight constraints, concern must be given that bending or deflection of the membrane of the backup plate is minimized. In that regard, reinforcing rings have been interposed at the inboard and outboard ends of the conical backup plate to impart compressive forces to the conical member, thus reinforcing that member by stiffening it. It has been found that such compressive stiffening substantially reduces the bending or deflection otherwise experienced thereby.

In the past, it was believed that the optimum positioning of the reinforcing rings at the opposite ends of the conical back plate was to position the rings with their cross sectional centers of mass generally geometrically aligned with a cross sectional center line of the conical member itself. But, such positioning has now been found to result in less than an optimum reduction of bending and deflection in the conical member. Accordingly, there is a need for a torque tube and conical back plate assembly in which the positioning of the reinforcing rings at opposite ends of the conical back plate is such as to optimize such reinforcement to prevent bending and deflection, while allowing for reduction in the mass of the metallic conical member itself, thus further reducing the weight of the brake assembly, without sacrificing integrity.

DISCLOSURE OF INVENTION

In light of the foregoing, it is a first aspect of the invention to provide a torque tube and conical back plate for aircraft brakes which provides enhanced strength and reinforcement against bending and deflection as compared to prior art structures.

Another aspect of the invention is the provision of a torque tube and conical back plate for aircraft brakes which allows for weight reduction in the brake assembly, without a reduction in performance or integrity.

Yet a further aspect of the invention is the provision of a torque tube and conical back plate for aircraft brakes wherein reinforcing rings are provided at the truncated ends of the conical back plate and are moved axially outboard such that their center of mass is outboard of a projection of the center cone of the conical member.

Yet a further aspect of the invention is the provision of a torque tube and conical back plate for aircraft brakes which optimizes strength and integrity of the conical back plate without an increase in weight.

The foregoing and other aspects of the invention which will become apparent as the detailed description proceeds are achieved by a torque tube and conical back plate assembly for aircraft brakes, comprising: a torque tube for receiving stator disks of a brake disk stack, said torque tube having an inboard end and an outboard end with respect to an orientation of mounting on an aircraft; a conical back plate extending from an outboard end of said torque tube, said conical back plate being of increasing diameter as it extends from said outboard end; first and second reinforcing rings circumferentially encompassing opposite ends of said conical back plate; and wherein a center of mass of at least one of said first and second reinforcing rings is toward the outboard end of the torque tube and conical back plate assembly from a midplane projection of said conical back plate.

BRIEF DESCRIPTION OF THE DRAWINGS

For a complete understanding of the objects, techniques and structure of the invention, reference should be made to the following detailed description and accompanying drawings wherein.

BEST MODE FOR CARRYING OUT THE INVENTION

Figure 1:
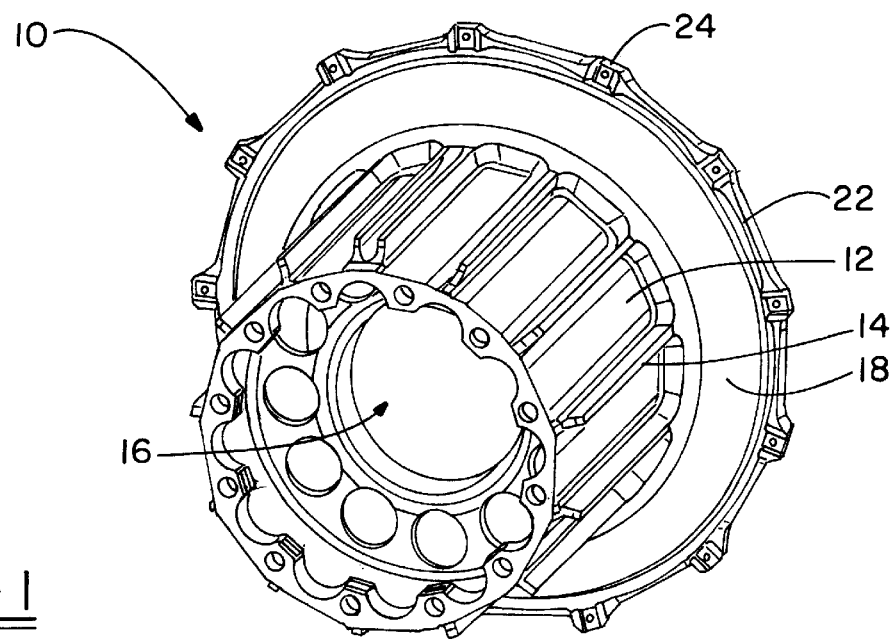
FIG. 1 is an isometric view of a torque tube and conical back plate made in accordance with the invention.
Figure 2:
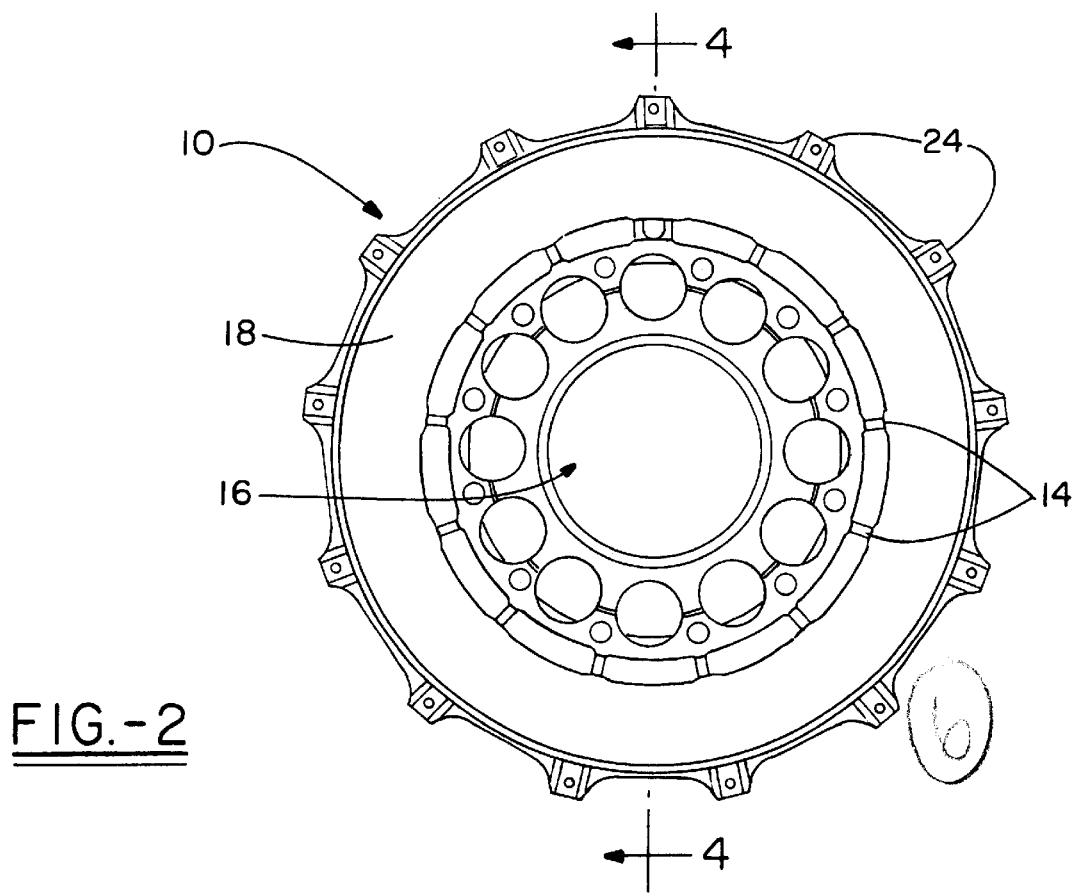
FIG. 2 is a front elevational view of the torque tube and conical back plate assembly of FIG. 1.

Referring now to the drawings and more particularly FIGS. 1 and 2, it can be seen that a torque tube and back plate assembly made in accordance with the invention is designated generally by the numeral 10. As shown therein, the assembly 10 includes a torque tube 12 having splines 14 adapted to receive axially slidable stator disks thereon. An aperture 16 is provided centrally of the assembly 10 to allow for receipt thereof over an aircraft wheel axle, such that the assembly 10 may be fixed to the aircraft about the axle. Of course, those skilled in the art will appreciate that rotor disks, alternately interleaved with the stator disks, are similarly keyed to the wheel and rotated therewith.

A conical back plate 18 is connected to and extends from an outboard end of the torque tube 12. Preferably, the conical back plate 18 is formed of thin metal such that the metal serves as a thin force dissipating web. Because of the thin nature of the conical back plate 18, an inner reinforcing ring 20 is integrally interposed between the inner end of the conical back plate 18 and the torque tube 12, while an outer reinforcing ring 22 is circumferentially positioned at the outboard end. The outer ring 22 is characterized by lugs 24 adapted for mounting an outboard annular disk of the brake disk stack.

Those skilled in the art will appreciate that a brake disk stack employing the torque tube and back plate assembly 10 would typically include a pressure plate at the inboard end, the pressure plate being actuated by brake actuators, either hydraulic or electric, pushing thereagainst. The force imparted to the pressure plate causes the pressure plate to urge the stator and rotor disks together toward the conical back plate 18, which is fixed and immovable. The braking force is generated by the frictional interengagement of the alternately interleaved stator and rotor disks, with the axial braking force being taken up by the conical back plate 18, serving as a membrane in tension.

Figure 3:
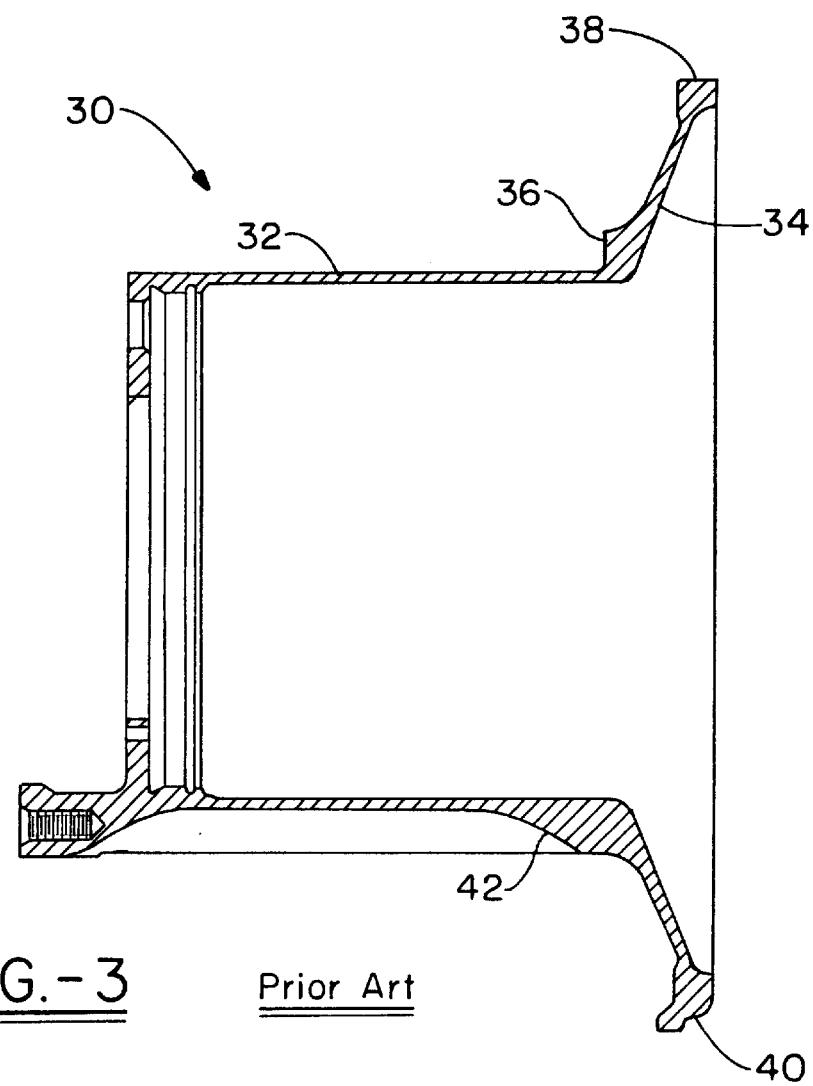
FIG. 3 is a prior art illustration of a torque tube and conical back plate assembly, shown in cross section.

Referring now to FIG. 3, it can be seen that a torque tube and back plate assembly made in accordance with the prior art is designated by the numeral 30. Here, a torque tube 32 is configured with a conical back plate 34 at the outboard end thereof. An inner reinforcing ring 36 interconnects the torque tube 32 with the membrane of the conical back plate 34, while an outer reinforcing ring 38 is positioned at the outboard end thereof. Again, mounting lugs 40 are provided for receiving and securing an end plate of the brake disk stack. According to the prior art, the inner and outer reinforcing rings 36, 38 are so positioned at opposite ends of the conical back plate 34 that an extension of a cone passing through the center of the conical back plate 34 would pass through the cross sectional centers of mass of the reinforcing rings 36, 38. In the past, it was believed that the rings 36, 38 best served as compression rings at opposite ends of the truncated cone 34 by being so uniformly positioned. With such a configuration, the reinforcing rings 36, 38 served to prevent twisting or distortion of the conical back plate 34. In other words, a midplane, actually conical in nature, of the cone 34 would intersect the cross sectional centers of mass of the reinforcing rings 36, 38 to achieve optimum strength, as practiced in the prior art. As shown in FIG. 3, a reinforcing bridge 32 is provided in conjunction with the inner reinforcing ring 36 at points about the circumference of the inner reinforcing ring in alignment with the mounting lugs 40. Such reinforcing bridges are in addition to and considered separately from the inner reinforcing ring 36.

Figure 5:
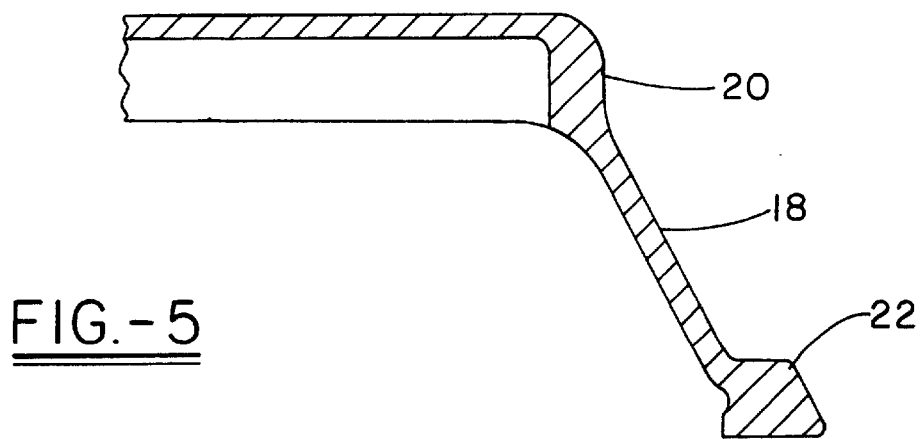
FIG. 5 is an exploded cross sectional view of the conical back plate structure of FIG. 4, showing the reinforcing rings at opposite ends thereof.
Figure 4:
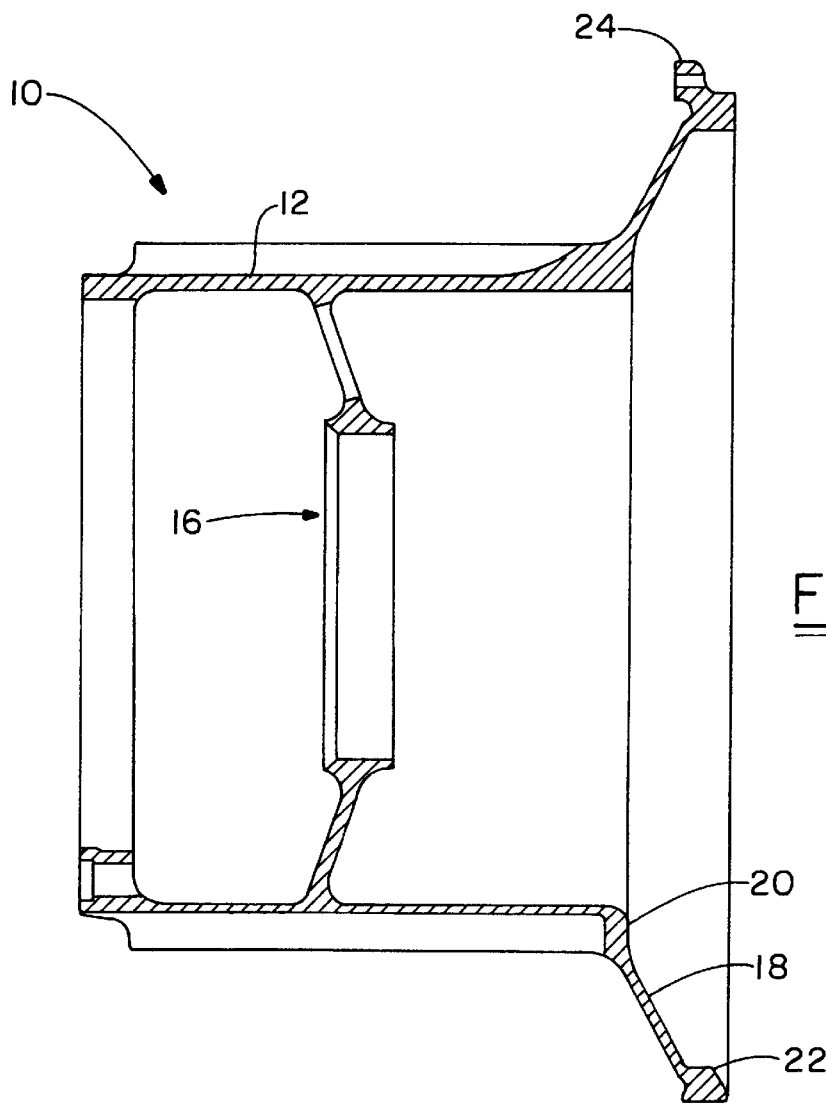
FIG. 4 is a cross sectional view of the torque tube and conical back plate assembly of the invention as taken along the line 4—4 in FIG. 2.
Figure 6:
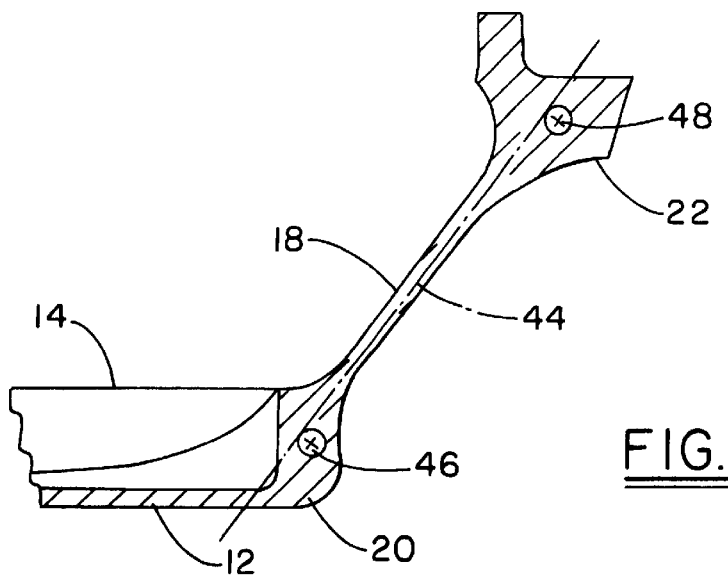
FIG. 6 is a cross sectional view of a conical back plate according to the invention, showing the displacement of the center of mass of the reinforcing ring toward the outboard end of the torque tube and conical back plate assembly.

Referring now to FIGS. 4–6, it can be seen that in accordance with the instant invention it has been found that the strength of the conical back plate 18 can be maximized, or at least significantly enhanced over the prior art, by moving the center of mass of the inner and outer reinforcing rings 20, 22 toward the outboard end of the assembly 10. In other words, the cross sectional center of mass is moved in the direction of the force application in the brake disk stack and, being so moved, has been found to significantly enhance the strength of the membrane defined by the conical back plate 18 over prior art configurations. In accordance with the invention, the cross sectional centers of mass 46, 48 of the inner and outer rings 20, 22 are moved outboard from the projection of the center plane 44 of the conical member 18. Of course, the center plane 44 is actually conical in nature, being at the center of the conical back plate 18 and equidistant from the inner and outer surfaces thereof. It has specifically been found that the compressive forces imparted to the membrane 18 therebetween are enhanced when the centers of mass of the reinforcing rings 46, 48 are shifted outboard from the projection 44 to an extent where greater than 50% and upwards to 90% of the mass of the reinforcing rings 20, 22 lie outboard of the center plane 44. By increasing the strength of the conical back plate 18 by such positioning of the rings 20, 22, it has been found that the thickness and resultant mass or weight associated with the conical back plate 18 may be reduced over that of prior art structures, without sacrificing strength or rigidity or the resistance of the back plate 18 to twisting or distortion during braking operations. Notably, although it is preferred that the cross sectional centers of mass 46, 48 of both the inner and outer rings 20, 22 are positioned outboard from the projection of center plane 44, it should be appreciated that beneficial results will also be realized when at least one of the cross sectional centers of mass 46, 48 are outboard from center plane 44.

Thus, it can be seen that the objects of the invention have been satisfied by the structure presented above. While in accordance with the patent statutes only the best mode and preferred embodiment of the invention has been presented and described in detail, the invention is not limited thereto or thereby. Accordingly, for an appreciation of the scope and breadth of the invention reference should be made to the following claims.

What is claimed is:

1. A torque tube and conical back plate assembly for aircraft brakes, comprising:
    a torque tube for receiving stator disks of a brake disk stack, said torque tube having an inboard end and an outboard end with respect to an orientation of mounting on an aircraft;
    a conical back plate extending from the outboard end of said torque tube, said conical back plate being of increasing diameter as it extends from said outboard end;
    first and second reinforcing rings circumferentially encompassing opposite ends of said conical back plate; and
    wherein a center of mass of each of said first and second reinforcing rings lies outboard of a center plane projection of said conical back plate.

2. The torque tube and conical back plate assembly according to claim 1, wherein said first and second reinforcing rings arc integral with said conical back plate.

3. The torque tube and conical back plate assembly according to claim 2, wherein greater than 50% and upwards to 90% of the mass of each of said first and second reinforcing rings lies outboard of the torque tube and conical back plate assembly from the centerplane projection of said conical back plate.

* * * * *